US006227054B1

(12) United States Patent
Ando et al.

(10) Patent No.: US 6,227,054 B1
(45) Date of Patent: *May 8, 2001

(54) VIBRATION WAVE DETECTING METHOD AND VIBRATION WAVE DETECTOR

(75) Inventors: Shigeru Ando, Chiba; Takaya Miyano, Osaka; Toshiyuki Matsumoto, Osaka; Muneo Harada, Osaka, all of (JP)

(73) Assignee: Sumitomo Metal Industries Limited, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/384,202

(22) Filed: Aug. 27, 1999

Related U.S. Application Data

(63) Continuation of application No. 09/084,096, filed on May 26, 1998, now Pat. No. 6,012,334.

(30) Foreign Application Priority Data

May 26, 1997 (JP) .................................................. 9-135564

(51) Int. Cl.[7] .............................. G01D 21/00; G01H 1/00
(52) U.S. Cl. ................................................. 73/651; 73/579
(58) Field of Search .............................. 73/579, 651, 645, 73/646, 648, 661, 659; 704/232, 256, 228, 233; 310/321, 322, 329–332

(56) References Cited

U.S. PATENT DOCUMENTS

| 2,906,117 | 9/1959 | Kennard, Jr. ............................ 73/651 |
| 3,457,463 | 7/1969 | Balamuth . |
| 4,305,298 | 12/1981 | Greenwood ............................ 73/651 |
| 4,341,189 | 7/1982 | Yamaguchi et al. .................... 73/651 |
| 4,373,396 | 2/1983 | Johnson ................................. 73/651 |
| 5,533,397 | 7/1996 | Sugitani et al. .................. 73/504.16 |
| 5,856,722 | 1/1999 | Haronian et al. ..................... 310/321 |
| 6,012,334 | * 1/2000 | Ando et al. ............................. 73/651 |

FOREIGN PATENT DOCUMENTS

| 37 03 946 | 8/1988 | (DE) . |
| 0 334 988 | 10/1989 | (EP) . |
| 53-045069 | 9/1951 | (JP) . |
| 58-002640 | 6/1956 | (JP) . |
| 59-38621 | 3/1984 | (JP) . |
| 59-135328 | 8/1984 | (JP) . |
| 62-251670 | 11/1987 | (JP) . |
| 63-61920 | 3/1988 | (JP) . |
| 4-77626 | 3/1992 | (JP) . |
| 5-052643 | 3/1993 | (JP) . |
| 6-229818 | 8/1994 | (JP) . |

OTHER PUBLICATIONS

Takuji Imai et al., "Speech Coder Utilizing Semiconductor. Jan. 1968." IBM Technical Disclosure Bulletin, vol. 10, No. 8, Jan. 1, 1968, pg. 1259 XP002135857 New York, US.
Translation of Japanese Paent Office Action including certification of translation for corresponding Japanese Patent Application No. 9–135564 mailed Nov. 21, 2000.
IEEE Signal Processing Magazine, pp. 45–57; Sep. 1996.

(List continued on next page.)

Primary Examiner—Helen Kwok
(74) Attorney, Agent, or Firm—Armstrong, Westerman, Hattori, McLeland & Naughton, LLP

(57) ABSTRACT

A vibration wave detector, having a receiver for receiving vibration waves such as sound waves and so on to be propagated in a medium, a resonant unit having a plurality of cantilever resonators each having such a length as to resonate at an individual predetermined frequency, a retaining rod for retaining the resonant unit, a vibration intensity detector for detecting the vibration intensity, for each predetermined frequency, of each of the resonators, by the vibration waves received by the receiver and propagated to the resonant unit by way of the retaining rod.

6 Claims, 8 Drawing Sheets

OTHER PUBLICATIONS

S. Nakagawa et al.; Neuro Science & Technology Series Speech Auditory and Neuro Circuit Network Model; pp. 116–125.

S. Nakagawa et al.; Neuro Science & Technology Series Speech Auditory and Neuro Circuit Network Model; pp. 162–171.

* cited by examiner

FIG. 2
PRIOR ART

| BAND NUMBER [BARK] | CENTRAL FREQUENCY [Hz] | CUTOFF FREQUENCY [Hz] | CRITICAL BAND WIDTH [Hz] |
|---|---|---|---|
|  |  | 20 |  |
| 1 | 50 | 100 | 80 |
| 2 | 150 | 200 | 100 |
| 3 | 250 | 300 | 100 |
| 4 | 350 | 400 | 100 |
| 5 | 450 | 510 | 110 |
| 6 | 570 | 630 | 120 |
| 7 | 700 | 770 | 140 |
| 8 | 840 | 920 | 150 |
| 9 | 1000 | 1080 | 160 |
| 10 | 1170 | 1270 | 190 |
| 11 | 1370 | 1480 | 210 |
| 12 | 1600 | 1720 | 240 |
| 13 | 1850 | 2000 | 280 |
| 14 | 2150 | 2320 | 320 |
| 15 | 2500 | 2700 | 380 |
| 16 | 2900 | 3150 | 450 |
| 17 | 3400 | 3700 | 550 |
| 18 | 4000 | 4400 | 700 |
| 19 | 4800 | 5300 | 900 |
| 20 | 5800 | 6400 | 1100 |
| 21 | 7000 | 7700 | 1300 |
| 22 | 8500 | 9500 | 1800 |
| 23 | 10500 | 12000 | 2500 |
| 24 | 13500 | 15500 | 3500 |

VIBRATION WAVE DETECTING METHOD AND VIBRATION WAVE DETECTOR

This application is a continuation of prior application Ser. No. 09/084,096 filed May 26, 1998 now U.S. Pat No. 6,012,334.

BACKGROUND OF THE INVENTION

1. Field of the Invention

The present invention relates to a vibration wave detecting method/detector for detecting the characteristics of the vibration waves, such as sound waves, to be propagated in a medium.

2. Description of the Prior Art

In the conventional system for executing speech recognition, vibrations of a microphone which received speech signals are converted-amplified into electric signals by an amplifier, and then, the analog signals are converted into digital signals by an A/D convertor to obtain speech digital signals. Fast Fourier transform is applied to the speech digital signals by a software on a computer, so as to extract the features of the speech. Such a speech recognition system as described above is disclosed in IEEE Signal Processing Magazine, Vol. 13, No. 5, pp. 45–57 (1996).

In order to extract the features of the speech signals with better efficiency, it is necessary to calculate acoustic spectra within a time period when the speech signals are considered stationary. The speech signal is normally considered stationary within the time period of 10 through 20 msec. Therefore, signal processing such as Fast Fourier transform or the like is conducted, by the software on the computer, on the speech digital signals included within the time period with 10 through 20 msec as a period.

In the conventional speech recognizing method as described above, the speech signals including the entire instantaneous zones are converted into electric signals by a microphone. To analyze the spectra of the electric signals, the A/D conversion makes the frequencies digital. The speech digital signal data are compared with the predetermined speech wave data to extract the features of the speech.

Auditory mechanism and sound psychological physical properties are described in detail by Ohm Company Co., 1992 in "Neuro Science & Technology Series Speech Auditory and Neuro Circuit Network Model" (pp. 116–125) written by Seiichi Nakagawa, Kiyohiro Shikano, Youichi Toukura under the supervision of Shunichi Amari. This literature shows that the measure of the sound pitch audible by human beings corresponds linearly to the measure of a mel scale, instead of corresponding to linearly to frequency as physical value. The mel scale, a psychological attribute (psychological measure) representing the pitch of the sound indicated by a scale, is a scale where the intervals of the frequencies called pitches can be heard equal in interval by human beings are directly numerated. The pitch of the sound of 1000 Hz, 40 phon is defined 1000 mel. An acoustic signal of 500 mel can be heard as a sound of 0.5 time pitch. An acoustic signal of 2000 mel can be heard as the sound of twice pitches. The mel scale can be approximated as in the following (1) equation by using the frequency f [Hz] as the physical value. Also, the relationship between the sound pitch [mel] and the frequency [Hz] in the approximate equation is shown in FIG. 1.

$$\text{mel} = (1000/\log 2)\log(f/1000 + 1) \quad (1)$$

In order to extract the features of the speech with better efficiency, it is often conducted to convert the frequency bands of the acoustic spectra into such mel scales. The conversion, into the mel scale, of the acoustic spectra is normally carried out by the software on the computer as in the analysis of the spectra.

Also, as a method of extracting the features of the speech with better efficiency, it is often conducted to convert the frequency bands of the acoustic spectra into a Bark scale. The Bark scale is a measure corresponding to the loudness of the psychological sound of the human being. In sounds of a certain degree or larger, the Bark scale shows the frequency band width (is called critical band width) audible by human beings, and sounds within the critical band width, even if they are different, can be heard the same. When, for example, large noises occur within the critical band width, the scale showing the frequency band wherein the signal sounds and its noises, despite different frequencies, cannot be judged with human auditory system, is the Bark scale.

In a field of the speech-signal processing, the critical band width to handle easily on the computer is demanded, and consequently the frequency axis of the acoustic spectra is shown in a Bark scale where one critical band is defined as one Bark. FIG. 2 shows the numerical value relationship between the critical band width and the Bark scale. The critical band width and the Bark scale can be approximated as in the following (2) and (3) equations, using the frequency f [kHz] as a physical value.

$$\text{Critical Band Width: } CB[\text{Hz}] = 25 + 75(1 + 1.4f^2)^{0.69} \quad (2)$$

$$\text{Bark Scale: } B[\text{Bark}] = 13 \tan^{-1}(0.76f) + 3.5 \tan^{-1}(f/7.5) \quad (3)$$

It is known to use an engineering functional model of acoustic peripheral system in the speech recognition field, and the conception of the model is described in detail in the Literature "Neuro Science & Technology Series Speech Auditory and Neuro Circuit Network Model" (pp.162–171). In the engineering functional model, frequency spectra analysis is preprocessed by band width filter groups. In, for example, the preprocessing at a Seneff model which is one of the representative engineering functional model, the frequency spectra analysis is conduced by critical band width filter groups having forty independent channels in the frequency range of 130 through 6400 Hz. At that time, the frequency band of the acoustic spectra is converted into the Bark scale.

The conversion into the Bark scale can be normally conducted by the software on the computer as in the other analysis of the spectra.

In the conventional method of conducting Fast Fourier transform on the digital acoustic signal, by the software on the computer, to analyze the spectra of the acoustic signal, the calculation amount becomes immense so that the calculating load becomes bigger. Even in conducting Fast Fourier transform on the acoustic signal spectra and conducting with the software on the computer to convert into the mel scale, the calculation amount becomes immense so that the calculating load becomes bigger. Even when the spectra of the acoustic signal is analyzed in the frequency spectra by critical band width filter groups, and converting into the Bark scale is conducted with the software on the computer, the calculation amount becomes immense and the calculating load becomes large.

In the conventional methods, there are not problems in the speech where the acoustic spectra does not change as time passes, like only vowel sounds. But a language is made up of consonant sounds and vowel sounds. When a consonant sound comes for a first time, and a vowel sound comes for a second time like Japanese, in general, the stress of the vowel sound becomes larger as time passes. And English is made up of complicated consonant sounds and vowel sounds. In these cases, conventionally, it was difficult to judge when the sounds were changed from consonant sounds to the vowel sounds, because the speech was recorded instantaneously, the acoustic spectra of the entire band were integrated through division for each constant time for analyzing of the speech. Therefore, the judging ratio of the speech recognition was reduced. In order to solve the problems, much more speech patterns are stored in advance in the computer and are applied into either of these speech patterns, thereby increasing calculation load more.

BRIEF SUMMARY OF THE INVENTION

One object of the present invention is to provide a vibration wave detecting method and detector capable of conducting quickly and accurately the frequency spectra analysis of the vibration waves on one hardware.

Other object of this invention is to provide a sound wave detecting method and detector capable of conducting quickly and accurately the acoustic signal detection and the frequency spectra analysis on one hardware.

Still other object of this invention is to provide a sound wave detecting method and detector capable of conducting quickly and accurately on one hardware the acoustic signal detection, the frequency spectra analysis and the conversion (conversion into mel scale or Bark scale) of the frequency scale.

A vibration wave detector of this invention comprises a receiver for receiving vibration waves to be propagated in a medium, a resonant unit having a plurality of cantilever resonators each having such a length as to resonate at an individual predetermined frequency, a retaining rod for retaining the resonant unit, and a vibration intensity detector for detecting the vibration intensity, for each predetermined frequency, of each of the resonators.

A vibration wave detector of this invention, comprising a receiver for receiving vibration waves to be propagated in the medium, a resonant unit having a plurality of cantilever resonators each having such a length as to resonate at an individual predetermined frequency, a retaining rod for retaining the resonant unit, a vibration intensity detector for detecting the vibration intensity of each of resonators, so that the vibration waves propagated in the medium are transmitted into the resonant unit through the retaining rod from the receiver to detect the intensity of the individual frequency component by the vibration intensity detector, includes a converting apparatus for converting the detected vibration intensity into electric signals for each predetermined frequency, an integrating apparatus for integrating the converted electric signals during an optionally set time period, and an outputting apparatus for outputting, for each predetermined frequency, the results integrated by the integrating apparatus after the optionally set time period has elapsed.

In the above described configuration, the band width of the resonant frequency in each resonator is set to a predetermined value with the interval between two adjacent resonators being made different.

In the above described configuration, the sound wave detector of this invention, where the vibration waves to be propagated in the medium are sound waves, is set so that the resonant frequencies in a plurality of resonators may be distributed in a mel scale. The band width corresponding to each resonant frequency is a critical band width.

In the above described configuration, the sound wave detector of this invention, where the vibration waves to be propagated in the medium are sound waves, is set so that the resonant frequencies in a plurality of resonators may be distributed in a Bark scale. The band width corresponding to each resonant frequency is a critical band width.

The sound wave detector of this invention can be used as a microphone for inputting musical notes to recognize the musical notes, a microphone for inputting speeches to recognize the speeches, and a microphone for inputting abnormal sounds to detect the abnormal sounds of a predetermined frequency.

The vibration wave detector of this invention, having a plurality of resonators each different length so that each may become resonant at the predetermined frequency, transmits to these resonators the vibration waves propagated in the medium so that the vibrations by each resonator may be detected by the vibration intensity detector. The detected vibration amplitude is converted into electric signals, which are inputted into the integrating apparatus to operate in synchronous relation with an optional period of clock, so as to integrate the input electric signals in a period of an optional period. The integrated results can be outputted for each of optional periods. In this case, the integrated results can be outputted for one predetermined frequency or for each of a plurality of predetermined frequencies.

The sound wave detector of this invention has a configuration similar to that of the above described vibration wave detector. It detects the sound waves, and the resonant frequency in each resonator may be distributed linearly in the mel scale, instead of the mathematically linear scale. The design of each resonator can be determined easily, because the actual resonant frequency and the mel scale correspond. It is determined in accordance with the (1) equation and FIG. 1. After the vibrations at each resonator in accordance with the mel scale specification are detected by the vibration intensity detector, the processing similar to that of the above described vibration wave detector is conducted so that the physical value corresponding to the spectra of the acoustic signals can be detected in the mel scale.

Another sound wave detector of this invention has a configuration similar to that of the above described vibration wave detector. It detects the sound waves, and the resonant frequency in each resonator may be distributed linearly in the Bark scale, instead of the mathematically linear scale, and the band width of each resonant frequency can be made a critical band width. The design of each resonator can be easily determined, because the actual resonant frequency and the Bark scale correspond. The cut-off frequency for determining the critical band width can be determined in accordance with the (2) and (3) equations and FIG. 2. After the vibrations at each resonator in accordance with the Bark scale specification are detected by the vibration intensity detector, the processing similar to that of the above described vibration wave detector is conducted so that the physical value corresponding to the spectra of the acoustic signals can be detected, with the critical band width, in the Bark scale.

In the sound wave detector of this invention, the acoustic spectra can be obtained at real time without conducting the analytic processing, because the intensity of the sound can be detected for each desired frequency. The invention of mechanically analyzing the acoustic signals in this way for each frequency band has a faster processing speed than the conventional system of inputting the acoustic signals of the entire band to electrically filter to each it, because the electric filtering operation is not necessary in the invention. Also, even if it is divided for any constant time periods, the acoustic data are complete. Since the acoustic data are obtained for each frequency in a constant time period, the passage of the intensity of each frequency can be recognized with the passage of time. For example, the time change of the vowel sounds and the consonant sounds can be judged correctly, so as to improve the judging ratio of the speech recognition.

The above and further objects and features of the invention will more fully be apparent from the following detailed description with accompanying drawings.

BRIEF DESCRIPTION OF THE SEVERAL VIEWS OF THE DRAWINGS

FIG. 2 is a table showing the numerical value relationship between the critical band width and the Bark scale;

DETAILED DESCRIPTION OF THE INVENTION

This present invention will be described concretely according to the drawings showing the embodiments. A sound wave detector wherein the sound waves are the vibration waves which are propagated in a medium will be described hereinafter by way of embodiments.

(First Embodiment)

Figure 3:
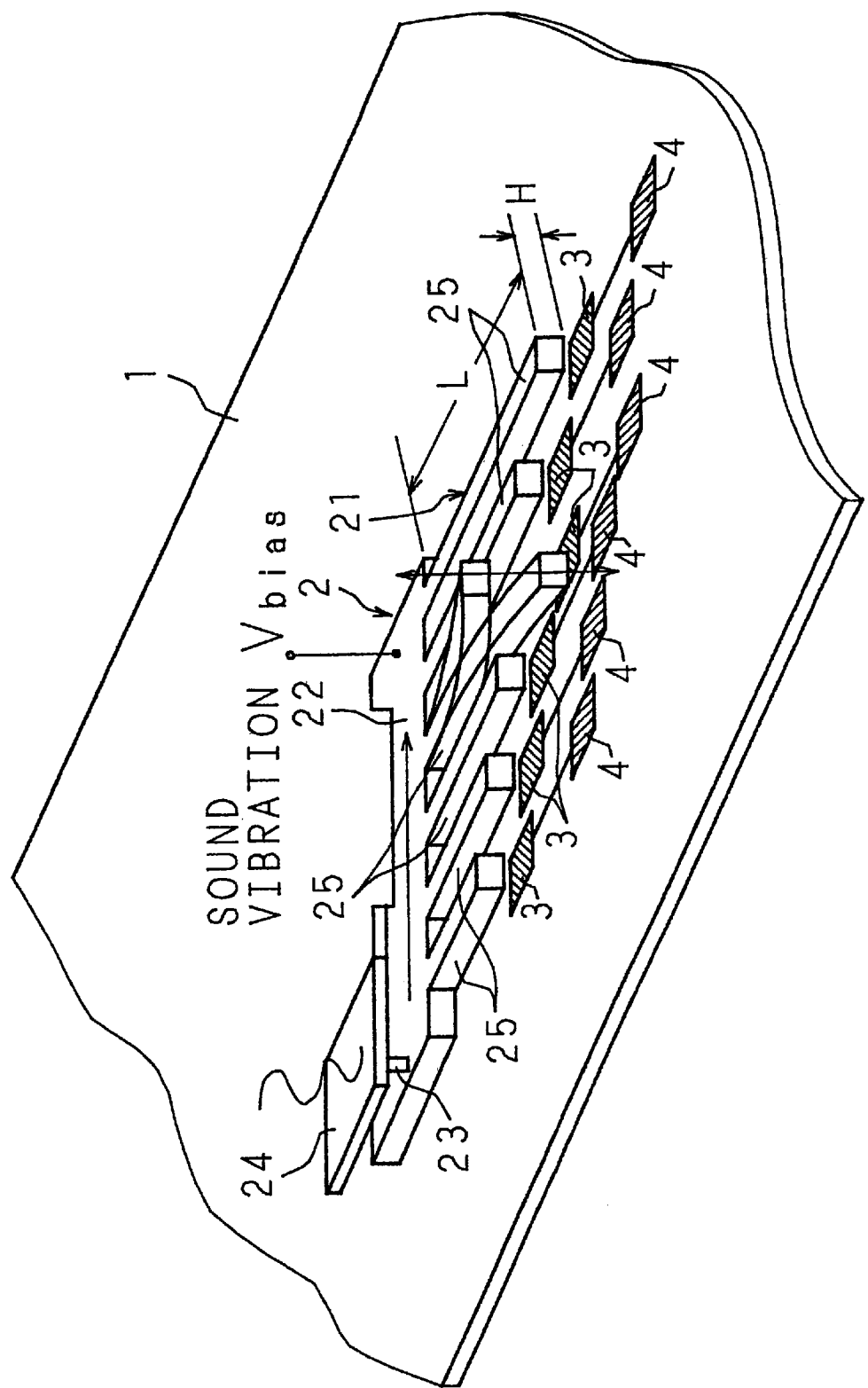
FIG. 3 is a view showing the embodiment of the sound wave detector of this invention.

FIG. 3 is a view showing an embodiment of a sound wave detector of this invention. The sound wave detector of this invention is composed of a sensor main body 2, electrodes 3 and detecting circuits 4 as peripheral circuits, which are formed on a silicon substrate 1 of semiconductor. The sensor main body 2, all the portions of which are formed of semiconductor silicon, comprises a resonant unit 21 having a plurality of (six in FIG. 3) cantilever portions each being different in length, a plate-shaped retaining rod 22 retaining the resonant unit 21 on the stationary end side of the resonance, a short rod-shaped propagating portion 23 erected on one end portion of the retaining rod 22, and a plate-shaped receiver 24 connected with the propagating portion 23 to receive the sound waves propagated in the air.

The resonant unit 21 is a comb teeth-shaped so that the respective cantilevers which are comb teeth-shaped portions are resonators 25 each being adjusted in length to resonate at the predetermined frequency. The plurality of resonators 25 are adapted to selectively vibrate in accordance with a resonant frequency f presented by the following (4) equation.

$$f = (CHE^{1/2})/(L^2 \rho^{1/2}) \tag{4}$$

wherein
C: constant to be determined experimentally
H: thickness of each resonator
L: length of each resonator
E: Young's modulus of material (semiconductor silicon)
$\rho$: density of material (semiconductor silicon)

As clear from the above (4) equation, the resonant frequency f can be set to a desired value by changing the thickness H or length L of the resonator 25. In the example shown in FIG. 3, the thickness H of all the resonator 25 is made constant and the length L is set to become sequentially longer from the left-hand side to the right-hand side so that each resonator 25 is adapted to have a natural resonant frequency. Concretely, a corresponding operation can be conducted from the low frequency to the high frequency within the range of approximately 15 Hz through 20 kHz in audible band towards the left-hand side from the right-hand side.

The sensor main body 2 of such a configuration as described above is made on the silicon substrate 1 of semiconductor by using a manufacturing art of an integrated circuit or a micromachine. In such a configuration, when the sound waves are propagated to the receiver 24, the plate-shaped receiver 24 is vibrated, and the vibrations showing the sound waves are transmitted to the retaining rod 22 through the propagating portion 23 so that the sound wave vibrations are adapted to be transmitted from the left of FIG. 3 to the right while each resonator 25 of the resonant unit 21 retained thereby resonates sequentially at the individual predetermined frequency.

A proper bias voltage Vbias is applied upon the sensor main body 2. A capacitor is composed of a tip end portion of each resonator 25 of the resonant unit 21 and each electrode 3 formed on the silicon substrate 1 of semiconductor and positioned opposite to the tip end portion. The tip end portion of the resonator 25 is a movable electrode moving vertically in that position through the vibration of the resonator 25. The electrode 3 formed on the silicon substrate 1 of semiconductor is a stationary electrode which does not move in that position. When the resonator 25 vibrates at the individual predetermined frequency, the distance between the movable electrode and the stationary electrode changes, and the capacity of the capacitor change.

Figure 4:
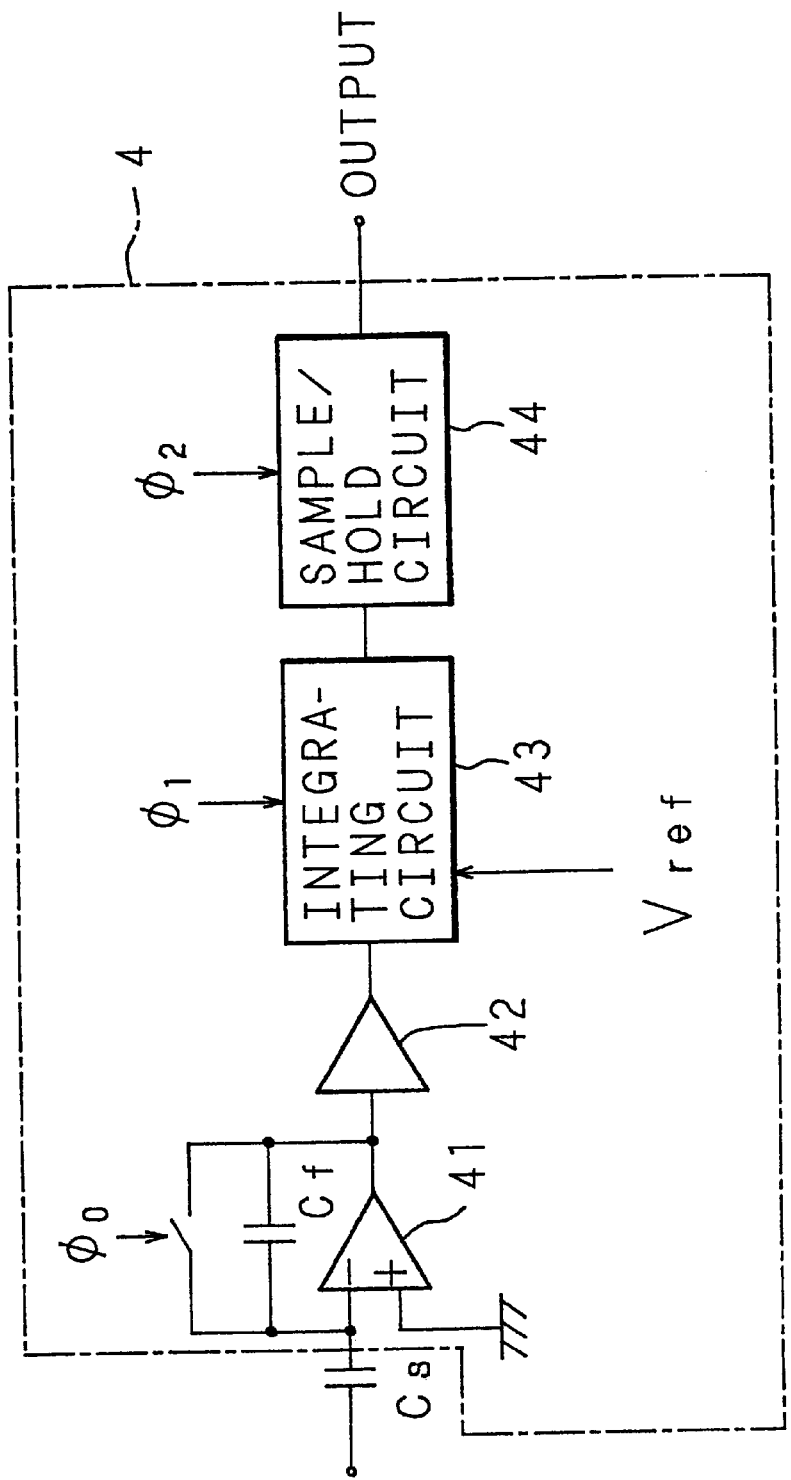
FIG. 4 is a diagram showing a configuration of a detecting circuit in the sound wave detector of this invention.

Each detecting circuit 4 is connected to one corresponding electrode 3. The detecting circuit 4 converts such capacity change into the voltage signals, integrates the converted voltage signals within a predetermined time period, and outputs the integrated results. FIG. 4 is a diagram showing a configuration of the detecting circuit 4. The detecting circuit 4 comprises operational amplifiers 41 and 42 which amplify a voltage at an amplifying ratio corresponding to an impedance ratio between the capacitor capacity $C_s$ and the reference capacity $C_f$, an integrating circuit 43 for integrating the output signals of the operational amplifier 42 higher than the reference voltage $V_{ref}$ during the predetermined time period, and a sample/hold circuit 44 for taking out the output signals from the integrating circuit 43 and temporarily retaining them so as to output them. Such the detecting circuit 4 is formed by, for example, a CMOS process.

Clock pulses $\phi_0$, $\phi_1$ and $\phi_2$ are fed respectively to the operational amplifier 41, the integrating circuit 43 and the sample/hold circuit 44. The operational amplifier 41, the integrating circuit 43 and the sample/hold circuit 44 respectively operate in synchronous relation with these clock pulses. These clock pulses may be fed externally or can be fed from a counter circuit which is formed on the same silicon substrate 1 of semiconductor.

An operation will be described hereinafter. When the sound waves propagated in air are transmitted to the receiver 24 of the sensor main body 2, the plate-shaped receiver 24 is vibrated to propagate the vibrations into the sensor main body 2. At this case, the sound waves from the left of FIG. 3 to the right are transmitted while vibrating each resonator 25 of the cantilever which becomes sequentially longer. Each resonator 25 has a natural resonant frequency. Each resonator 25 becomes resonant when the sound waves of the natural frequency are propagated to vertically vibrate its tip end portion. The capacity of the capacitor to be composed between the tip end portion and the electrode 3 changes by the vibrations. As the energy of the sound waves is sequentially converted into the vibrating energy of the resonators 25 as the sound waves are propagated, the energy of the sound waves is gradually damped by such resonance. The energy is almost removed by the time when the sound waves reach the longest resonator 25 (a right end of FIG. 3), thereby causing no reflected waves. Thus, there is no likelihood of the reflected waves influencing the capacity changes, and correct capacity changes corresponding to the spectra of the propagated sound waves can be detected.

Figure 5:
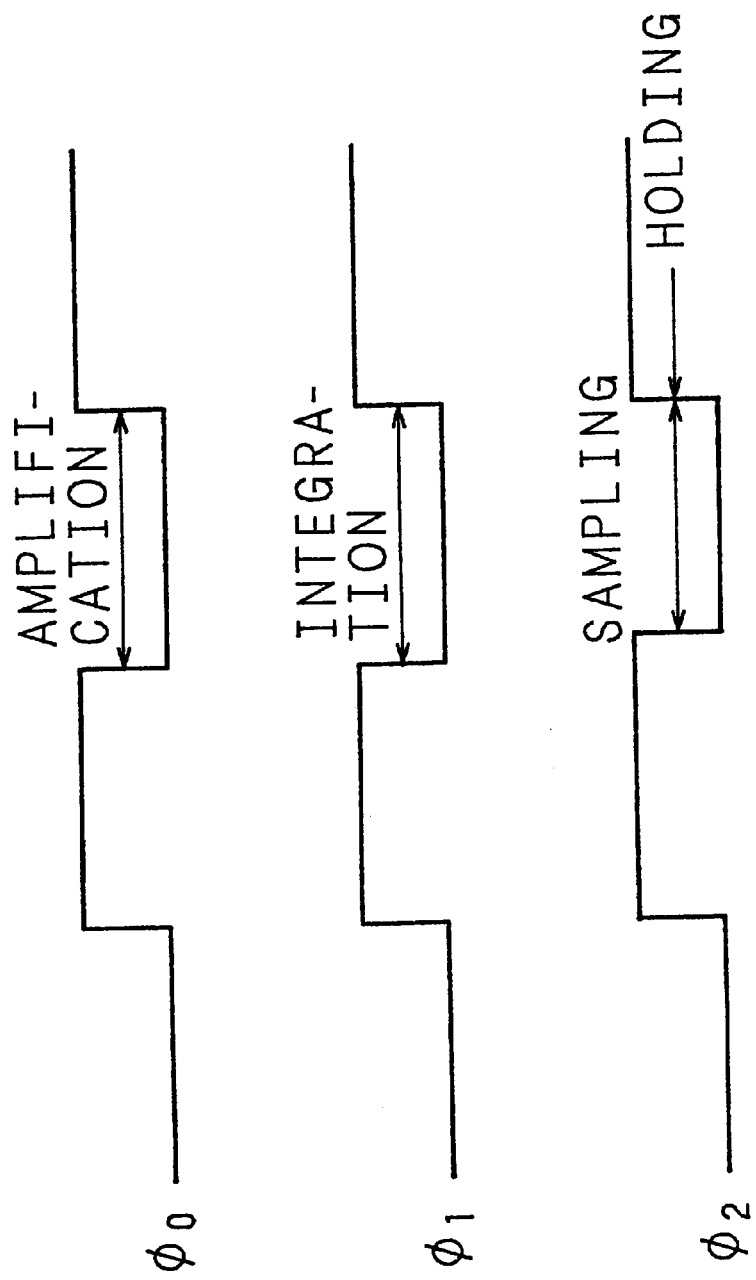
FIG. 5 is a diagram showing a timing chart of the detecting circuit in the sound wave detector of this invention.

The obtained capacity changes are fed into the detecting circuit 4. FIG. 5 is a diagram showing a timing chart within the detecting circuit 4 wherein clock pulses $\phi_0$, $\phi_1$ and $\phi_2$ are fed respectively to the operational amplifier 41, the integrating circuit 43 and the sample/hold circuit 44. The clock pulse controlling in the present embodiment is ON condition at the low level.

Within the detecting circuit 4 is determined an amplifying ratio in accordance with the impedance ratio between the capacity Cs of the capacitor obtained by the operational amplifier 41 and the reference capacity $C_f$. When, for example, the value of $1/\omega C_s$ to the $1/\omega C_f$ ($\omega=2\pi f$, f: frequency) is 1/2, the voltage signal to be obtained becomes twice. As the operational amplifiers 41 and 42 are also inverters with the + input terminal being grounded, the voltage phase is inverted one time by the next stage of operational amplifier 42. The obtained amplified voltage signals are inputted into the integrating circuit 43. In the integrating circuit 43, the amplified voltage signals higher than the reference voltage $V_{ref}$ are integrated within the predetermined time period corresponding to the clock pulse 1 to output the integrated signal to the sample/hold circuit 44. In the sample/hold circuit 44, the sampling and holding of the integrated signal is repeated in accordance with the clock pulse $\phi_2$, and the integrated signal is outputted.

Such a processing operation is conducted in parallel for each detecting circuit 4 corresponding respectively to the resonators 25 each being different in length. The period of such clock pulses $\phi_0$, $\phi_1$ and $\phi_2$, as shown in FIG. 5 is an example. It is needless to say that the period of each clock pulse may be optionally set.

In this invention, as described above, the lapse change of the sound intensity of the predetermined frequency with an optional time being made a period can be known by investigating the output signal of the detecting circuit 4 corresponding to the resonator 25 to resonate at the individual predetermined frequency. The lapse change of the sound intensity for each of a plurality of frequency bands with an optional time being made a period can be known by investigating the output signals of the detecting circuits 4 corresponding to a plurality of resonators 25.

Figure 6:
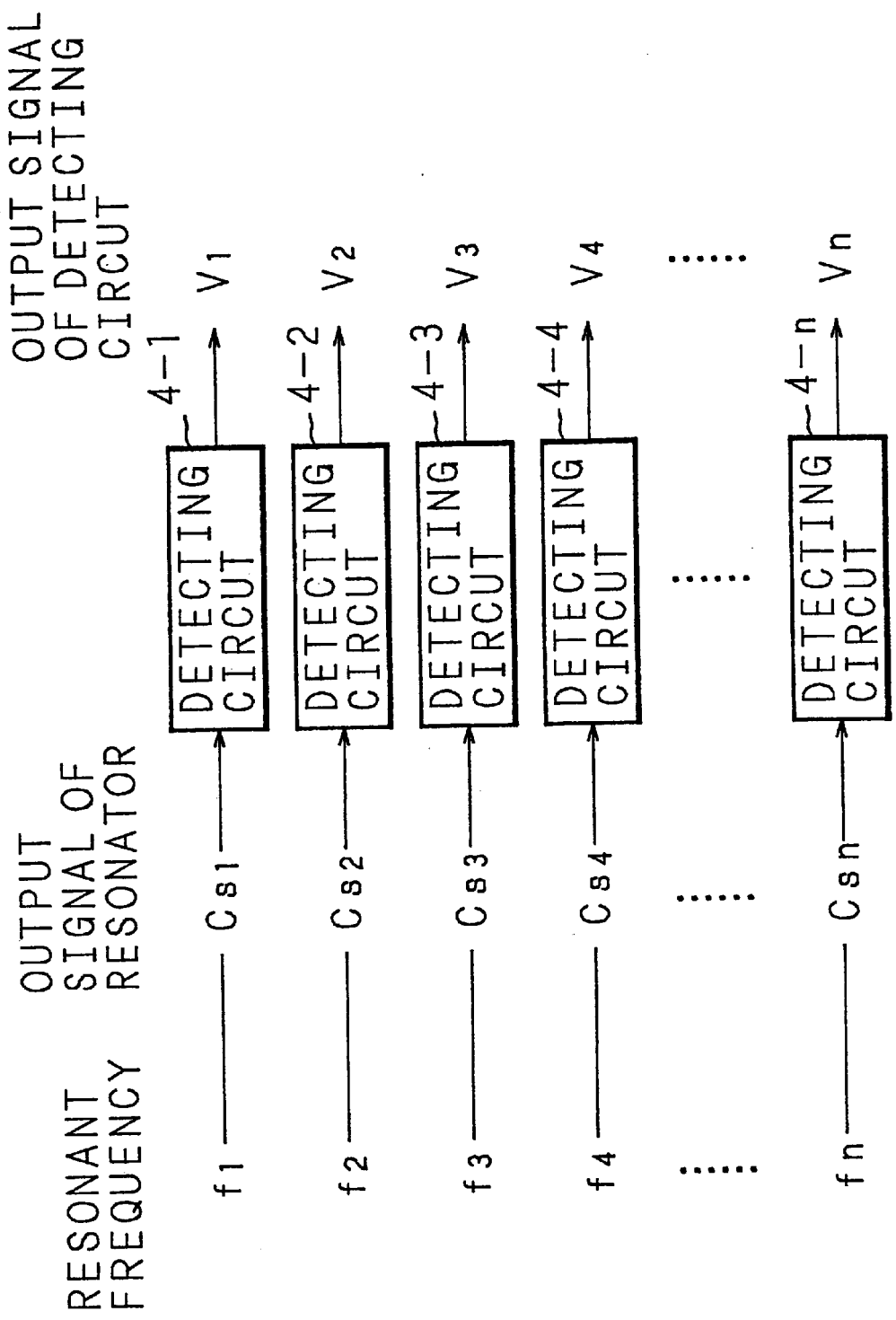
FIG. 6 is a diagram showing the relationship of each detecting circuit corresponding to a predetermined frequency.

FIG. 6 is a diagram showing the relationship of each detecting circuit 4 corresponding to the predetermined frequency. For example, when the n number of resonators are provided to selectively vibrate in response respectively to n types of resonant frequencies $f_1, f_2, f_3, f_4, \ldots, f_n$, the output signals $V_1, V_2, V_3, V_4, \ldots, V_n$ according to the resonant intensity for each resonant frequency can be obtained. When, for example, the sound wave detector of this invention is used as a microphone for inputting speeches to recognize the speeches, the intensity of the frequency is obtained in accordance with the resonant intensity for each resonant frequency in the audible band, so as to recognize the speeches on the basis of the obtained analysis pattern.

In detecting the intensity of only the frequency optionally selected of the sound waves, only the output signal of the detecting circuit 4 corresponding to the necessary resonant frequency has to be obtained. For example, in detecting the intensity of the frequencies $f_1$ and $f_3$ in FIG. 6 is obtained, the outputs of the other detecting circuits 4-2 and 4-4, . . . , 4-n which are not corresponded are cut off or the detecting circuits 4-2, 4-4, . . . , 4-n are not provided in advance so that the necessary output signals $V_1$ and $V_3$ are obtained but the unnecessary output signals $V_2, V_4, \ldots, V_n$ are not obtained. A microphone for detecting the abnormal sounds which is predetermined one or a plurality of frequencies is a preferable embodiment, as an example for the use of such a sound wave detector.

(Second Embodiment)

A second embodiment where the resonant frequency in each resonator is distributed linearly in the mel scale which is a psychological attribute representing the pitch of the sound as shown in a musical scale will be described. In the configuration of the sound wave detector of the second embodiment, similar to the configuration of the first embodiment, the resonant frequency in each resonator 25 is adapted to be distributed linearly in the mel scale, not in the mathematically linear scale. Namely, when the resonant frequencies in the n number of resonators 25 are made $f_1, f_2, f_3, \ldots, f_n$, $$f_1[\text{mel}]=\alpha f_2[\text{mel}]= \ldots =\alpha^{n-1}f_n[\text{mel}]$$

is set, instead of $$f_1[\text{Hz}]=\alpha f_2[\text{Hz}]= \ldots =\alpha^{n-1}f_n[\text{Hz}]$$

wherein $\alpha$ is a coefficient which can be optionally set.

Figure 1:
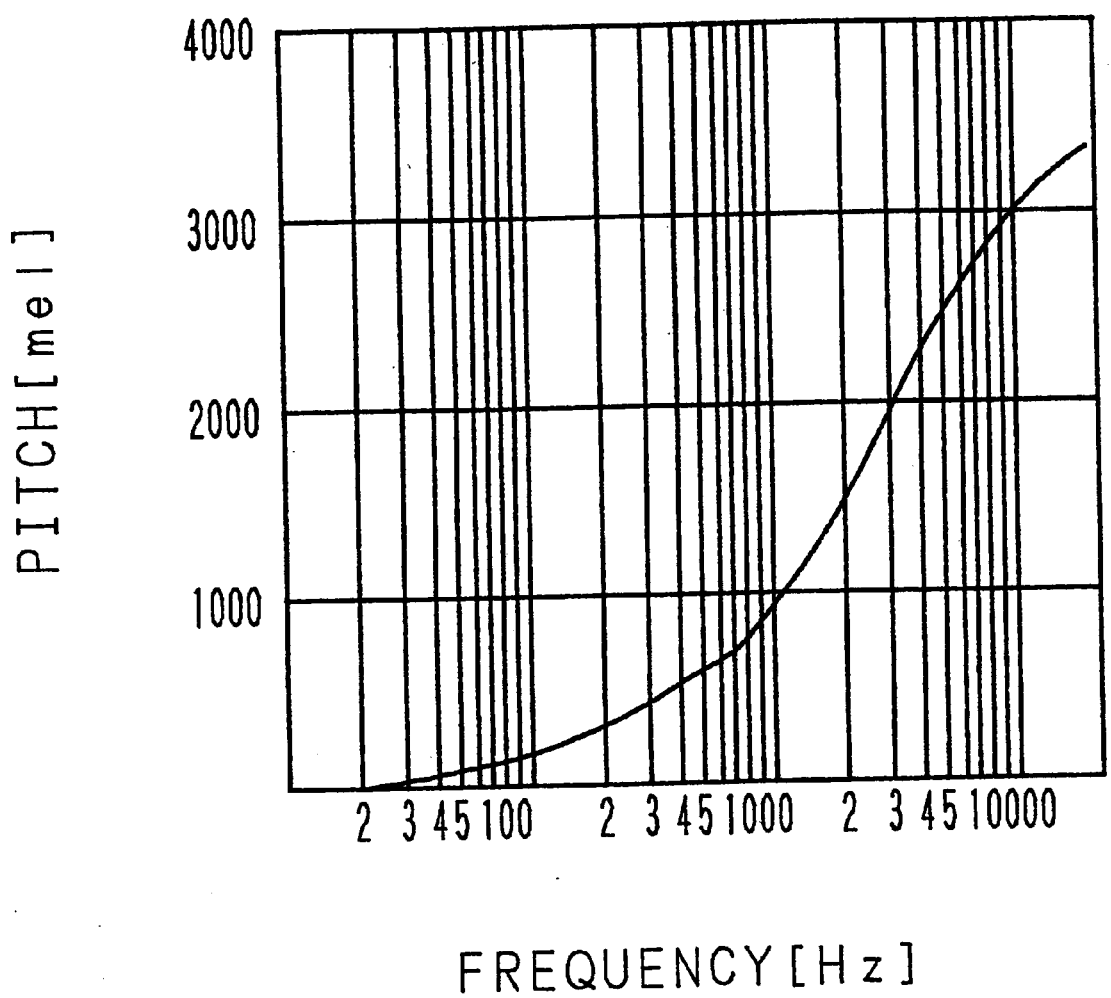
FIG. 1 is a graph showing the relationship between the actual frequency and the mel scale value.

Since the resonant frequency of each resonator 25 is determined in the (4) equation and the correspondence between the actual vibration frequency and the mel scale is determined in accordance with the (1) equation and FIG. 1 as described above, the optional resonant frequency in the mel scale can be easily assigned to each resonator 25. In this embodiment, the resonant frequency in accordance with the frequency which becomes equal in distance in the mel scale can be obtained with the thickness H of all the resonators 25 being constant and the length L being made different.

As the other configuration and operation are same as those of the above described first embodiment, the description thereof will be omitted.

Now that the resonant frequency of each resonator 25 is adapted to be distributed in the mel scale in the second embodiment, human audible octave sounds, half tones and so on can be selectively recognized at real time so that the microphone having frequency characteristics adjusted to the human audition can be made. A microphone for inputting speeches can be constructed, which is superior not only in speech recognition, abnormal sound detection, but also in discrimination property to intoned speeches such as reading, poetry and the like and sounds with the scale such as musical notes, because the time change in the pitch sounds of the octave sounds, half tones and so on can be more correctly judged.

(Third Embodiment)

A third embodiment where the resonant frequency in each resonator is distributed linearly in the Bark scale which is a psychological attribute representing the loudness of the sound will be described. In the configuration of the sound wave detector of the third embodiment, similar to the configuration of the first embodiment, the resonant frequency in each resonator 25 is adapted to be distributed in the Bark scale, instead of the mathematically linear scale, and the band width of the resonant frequency in each resonator 25 is the critical band width.

In accordance with the corresponding relationship between the Bark scale and the actual frequency shown in FIG. 2, the resonant frequency of each resonator 25 is determined. Although the resonant frequency of each resonator 25 is determined in the (4) equation, in this embodiment, the optional resonant frequency in the Bark scale is assigned to each resonator 25 by setting the thickness H of all the resonators 25 being constant and the length L being made different.

The band width of the resonant frequency of each resonator 25 depends upon the interaction with respect to the adjacent resonator 25. Namely, the band width is determined by the change ratio of the resonant frequency of the adjacent resonator 25, the design value in configuration like the distance between the adjacent resonators 25, the viscosity of the medium between the adjacent resonators 25, and so on. But in this present embodiment, the band width of the resonant frequency of each resonator 25 is controlled by changing the distance between the adjacent resonators 25.

Figure 7:
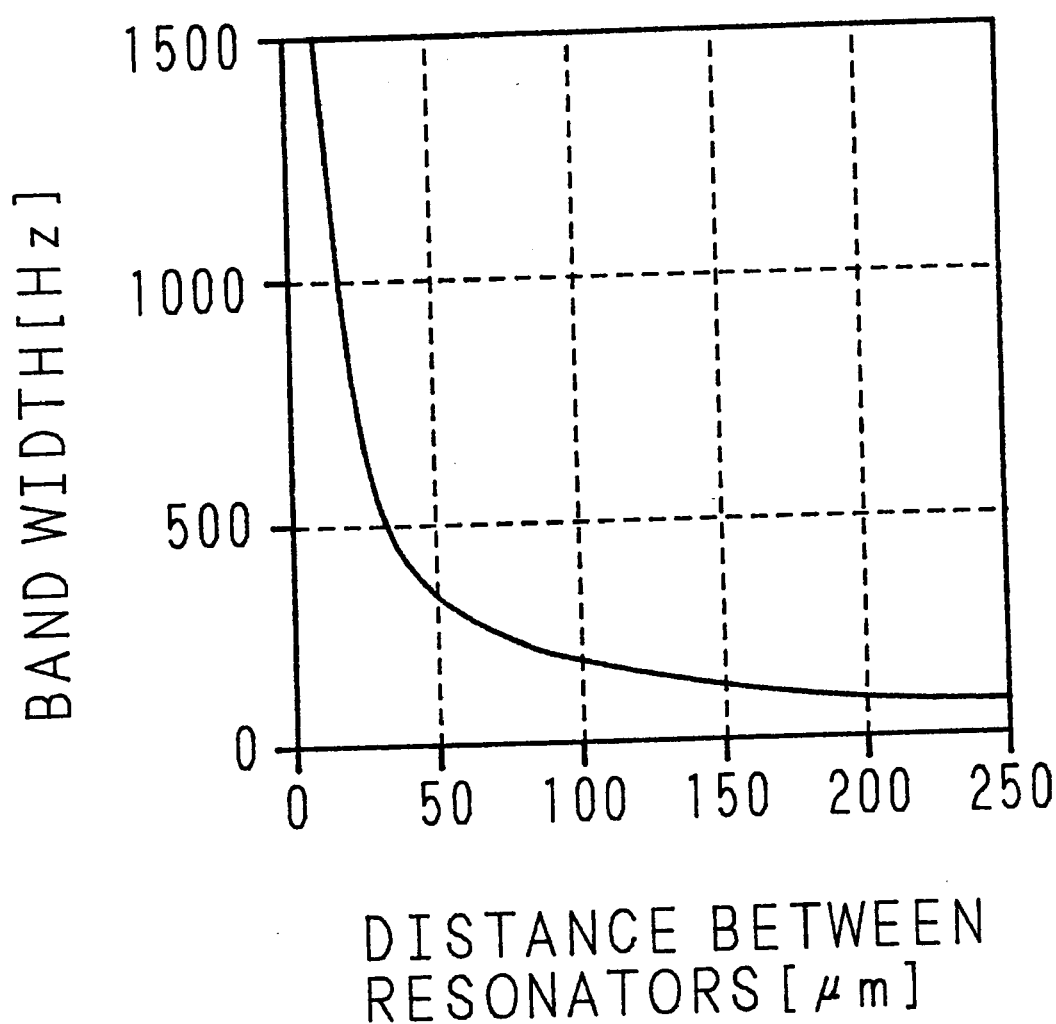
FIG. 7 is a graph showing the relationship of the distance between the resonators, and the band width.
Figure 8:
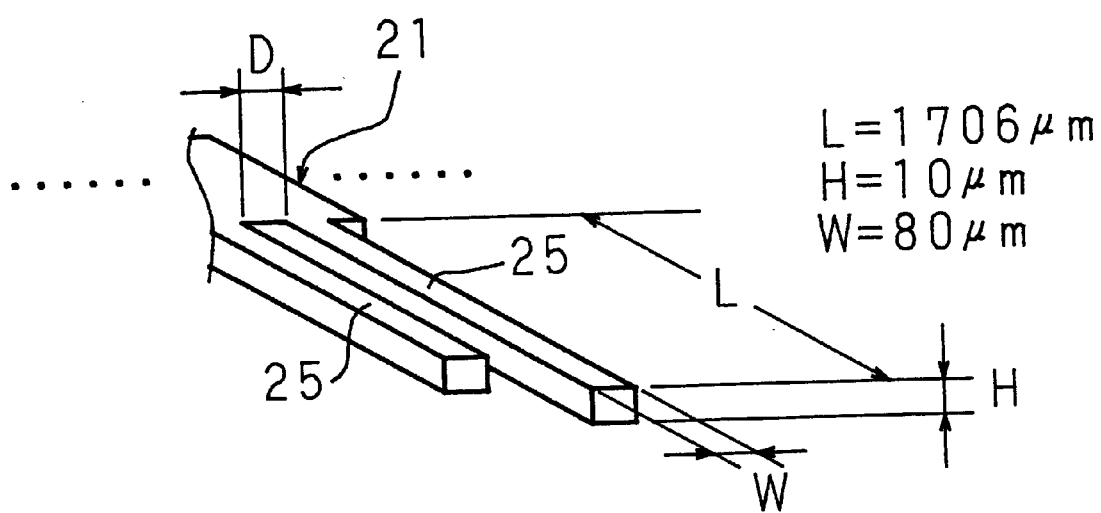
FIG. 8 is a view showing the relationship between the length, thickness, width and distance of the resonators in the sound wave detector of this invention.

FIG. 7 is a graph showing change in the band width (ordinate) when the distance D (abscissa) changes wherein D is a distance between the adjacent resonators 25 in a single crystal silicon made resonator 25 which has 3 kHz in resonant frequency. FIG. 8 is a view showing the relationship between the length L, the thickness H, the width W and the distance D in the resonator 25. The design value of the resonator 25 is length L=1706 μm, thickness H=10 μm and width W=80 μm. The gas between the adjacent resonators 25 and 25 is air. It can be understood from FIG. 7 that the desired band width can be set by adjusting the distance D between the adjacent resonators 25. Considering this fact, in this embodiment, the distance D between the adjacent resonators 25 and 25 is determined so that the band width of each resonator 25 may be a critical band width shown in FIG. 2.

In the third embodiment, the resonant frequency of each resonator 25 is adapted to be distributed in the Bark scale so that the frequency characteristics and band width adjusted to the human audition can be provided, and the acoustic signals hidden in the noises can be easier to be selected, so as to make it possible to improve the judging ratio of the speech recognition under the situation where noises are more. Also, the sensor more approximate to the human audition can be provided.

(Fourth Embodiment)

Even in the second embodiment where the resonant frequency in each resonator 25 is distributed linearly in the mel scale, it is effective that the band width of the resonant frequency in each resonator 25 becomes a critical band width as in the third embodiment.

Although, in each of the above described embodiments, the band of the predetermined resonant frequency at a plurality of resonators 25 is made a range of 15 Hz through 20 kHz, it is an example. It is needless to say that the band can be other frequency ranges. As the waves are sounds, the frequency range is several Hz through 50 kHz (up to 100 kHz at maximum).

As described above, in the sound wave detector of this invention, the conventional electric filtering processing using a software is unnecessary, thereby making the processing speed faster, because the sound waves are mechanically analyzed for each frequency band before the conversion into electrical signals. As it can be made easily on the semiconductor substrate, the occupying area can be reduced as compared with the conventional system so that the cost can be made lower. Furthermore, as the intensity of the sound for each of desired frequencies can be detected, the acoustic spectra can be obtained at real time without the analytic processing. Also, the acoustic data can be obtained for frequencies of each constant time, the passage of the intensity of each frequency can be confirmed as time elapses and the time change of the speech can be correctly judged, so as to improve the judging ratio of the speech recognition.

The sound wave detector of this invention can recognize the speech in a condition more approximate to the human audition so that the characteristics of the speech can be extracted with better efficiency at the speech recognition, because the detector has assembled resonators of having resonant frequency to be distributed in the mel scale or assembled resonators having the critical band width with the resonant frequency being distributed in the Bark scale.

Although the sound wave detector with the vibration waves as sound waves is described as an example of this invention, it is needless to say that the frequency spectra analysis of the vibration waves can be conducted with similar configuration even in the vibration waves except for the sound waves.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such mates and bounds thereof are therefore intended to be embraced by the claims.

What is claimed is:

1. A vibration wave detecting method, comprising the steps of:

receiving, by a receiver, vibration waves to be propagated in a medium, wherein said receiver is connected to a plurality of cantilever resonators by a rod;

propagating the vibration waves from one end of said rod to the other end thereof;

propagating the vibration waves from said rod into said plurality of cantilever resonators each having a length to resonate at an individual predetermined frequency; and detecting a vibration intensity for each predetermined frequency of each of the resonators.

2. The vibration wave detecting method of claim 1, wherein the vibration waves are sound waves.

3. A vibration wave detector, comprising:

a receiver for receiving vibration waves to be propagated in a medium;

a resonant unit having a plurality of cantilever resonators each having a length to resonate at an individual predetermined frequency;

a retaining rod for retaining the resonant unit and propagating the vibration waves from said receiver at one end of said rod to the other end of said rod and into said plurality of cantilever resonators; and a vibration intensity detector for detecting a vibration intensity for each predetermined frequency of each of the resonators.

4. The vibration wave detector of claim 3, wherein the distance between two adjacent resonators is different.

5. The vibration wave detector of claim 3, wherein the band width about the resonant frequency in each of the resonators is set to a predetermined value with the different distance between two adjacent resonators.

6. The vibration wave detector of claim 3, wherein the receiver, the resonant unit, the retaining rod and the vibration intensity detector are composed on a semiconductor substrate.

* * * * *